US010324734B2

(12) United States Patent
Kirkpatrick

(10) Patent No.: US 10,324,734 B2
(45) Date of Patent: Jun. 18, 2019

(54) APPLICATION CONTAINERS

(71) Applicant: Google Inc., Mountain View, CA (US)

(72) Inventor: Ficus Kirkpatrick, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 85 days.

(21) Appl. No.: 15/406,520

(22) Filed: Jan. 13, 2017

(65) Prior Publication Data
US 2017/0206090 A1   Jul. 20, 2017

Related U.S. Application Data

(60) Provisional application No. 62/279,571, filed on Jan. 15, 2016.

(51) Int. Cl.
*G06F 8/61* (2018.01)
*G06F 8/65* (2018.01)
*G06F 9/54* (2006.01)
*G06F 9/445* (2018.01)
*H04L 29/08* (2006.01)

(52) U.S. Cl.
CPC ............ *G06F 9/44505* (2013.01); *G06F 8/61* (2013.01); *G06F 8/65* (2013.01); *G06F 9/445* (2013.01); *G06F 9/44521* (2013.01); *H04L 67/34* (2013.01); *G06F 9/546* (2013.01)

(58) Field of Classification Search
CPC .............................. G06F 9/445; G06F 9/44505
USPC ........................................................ 717/174
See application file for complete search history.

(56) References Cited

U.S. PATENT DOCUMENTS

| 6,292,933 | B1 | 9/2001 | Bahrs et al. |
| 6,317,143 | B1 | 11/2001 | Wugofski |
| 6,754,896 | B2 | 6/2004 | Mishra et al. |
| 7,181,686 | B1 | 2/2007 | Bahrs |

(Continued)

FOREIGN PATENT DOCUMENTS

| KR | 1020070109310 A | 11/2007 |
| WO | 2011080615 A1 | 7/2011 |

(Continued)

OTHER PUBLICATIONS

"6. The IoC container," The Spring Framework, retrieved on Jan. 8, 2016, from http://docs.spring.io/spring/docs/current/spring-framework-reference/html/beans.html, 152 pp.

(Continued)

*Primary Examiner* — James D. Rutten
(74) *Attorney, Agent, or Firm* — Shumaker & Sieffert, P.A.

(57) ABSTRACT

In some examples, a method includes receiving, by a supervisor component executing at a computing device, a request to execute an application, and determining, by the supervisor component, whether any application container is currently allocated for the application. The method may also include, responsive to determining that an application container is currently allocated for the application: activating, by the supervisory, the application container currently allocated for the application, and executing, by the application container for the application, the application, and, responsive to terminating execution of the application, deactivating, by the supervisor component, the application container for the application.

19 Claims, 5 Drawing Sheets

(56) References Cited

U.S. PATENT DOCUMENTS

| | | | |
|---|---|---|---|
| 7,206,844 | B2 | 4/2007 | Gupta et al. |
| 7,698,383 | B2 | 4/2010 | Goring et al. |
| 7,707,574 | B2 | 4/2010 | Goring et al. |
| 8,095,940 | B2 | 1/2012 | Bissett et al. |
| 8,112,749 | B2 | 2/2012 | Jelinek et al. |
| 8,495,625 | B1* | 7/2013 | Sanders .............. G06F 8/60 717/174 |
| 8,782,744 | B1 | 7/2014 | Fuller et al. |
| 8,832,296 | B2* | 9/2014 | Yandek .............. G06F 8/65 709/231 |
| 8,943,150 | B2 | 1/2015 | Massey et al. |
| 9,612,815 | B1 | 4/2017 | Jagtap et al. |
| 9,675,890 | B2 | 6/2017 | Ahiska et al. |
| 9,705,973 | B2 | 7/2017 | Austel et al. |
| 9,772,835 | B1* | 9/2017 | Trautmann .......... G06F 8/65 |
| 9,773,102 | B2 | 9/2017 | Graham et al. |
| 9,817,648 | B2 | 11/2017 | Kirkpatrick |
| 9,854,047 | B2 | 12/2017 | Elias et al. |
| 9,871,745 | B2 | 1/2018 | Steinder et al. |
| 9,898,397 | B2 | 2/2018 | Arif et al. |
| 2004/0103412 | A1 | 5/2004 | Rao et al. |
| 2005/0049790 | A1 | 3/2005 | Holman et al. |
| 2005/0193139 | A1* | 9/2005 | Vinson .............. G06F 9/445 709/231 |
| 2006/0075381 | A1 | 4/2006 | Laborczfalvi et al. |
| 2009/0133014 | A1 | 5/2009 | Laurila et al. |
| 2009/0265788 | A1 | 10/2009 | Ehrenschwender et al. |
| 2010/0313196 | A1* | 12/2010 | De Atley ............ G06F 8/61 717/174 |
| 2011/0119684 | A1 | 5/2011 | Suggs et al. |
| 2013/0019237 | A1 | 1/2013 | Pardehpoosh et al. |
| 2013/0204975 | A1 | 8/2013 | Keith, Jr. |
| 2013/0325967 | A1 | 12/2013 | Parks et al. |
| 2014/0007074 | A1 | 1/2014 | Sporkert et al. |
| 2014/0215451 | A1 | 7/2014 | Nachtigal |
| 2014/0229951 | A1* | 8/2014 | Zhang ............... G06F 9/445 718/100 |
| 2014/0282884 | A1 | 9/2014 | Bao et al. |
| 2014/0289807 | A1* | 9/2014 | Collado ............. G06F 21/44 726/4 |
| 2014/0365336 | A1 | 12/2014 | Hurewitz |
| 2015/0242622 | A1* | 8/2015 | Xu .................. G06F 21/53 726/1 |
| 2015/0301824 | A1* | 10/2015 | Patton ............... G06F 8/71 717/122 |
| 2016/0173540 | A1 | 6/2016 | Linden et al. |
| 2016/0261716 | A1* | 9/2016 | Khalaf ............. H04L 67/1002 |
| 2017/0206071 | A1 | 7/2017 | Kirkpatrick |
| 2018/0060055 | A1 | 3/2018 | Kirkpatrick |

FOREIGN PATENT DOCUMENTS

| | | | |
|---|---|---|---|
| WO | 2013101950 | A1 | 7/2013 |
| WO | 2014193434 | A1 | 12/2014 |

OTHER PUBLICATIONS

Escoffier et al., "iPOJO: an Extensible Service-Oriented Component Framework," IEEE International Conference on Services Computing, Grenoble University, Jul. 9-13, 2007, 8 pp.

Buck et al., "An API for Runtime Code Patching," International Journal of High Performance Computing Applications, vol. 14 Issue 4, Nov. 2000, pp. 317-329.

"App Container Image," GitHub, Inc., retrieved on Dec. 9, 2015, from https://github.com/appc/spec/blob/master/spec/aci.md, 7 pp.

"App Container Specification," GitHub Inc., retrieved on Jun. 11, 2015, from https://github.com/appc/spec/blob/master/SPEC.md#app-container-image, 2 pp.

"App Container Pods," GitHub Inc., retrieved on Dec. 9, 2015, from https://github.com/appc/spec/blob/master/spec/pods.md, 5 pp.

Jianhui et al., "Run-Time Data-Flow Analysis," Journal of Computer Science & Technology, vol. 17 Issue 4, Jul. 2002, pp. 442-449.

"App Thinning (iOS, tvOS, watchOS)," Apple Inc., Oct. 21, 2015, from https://developer.apple.com/library/watchos/documentation/IDEs/Conceptual/AppDistributionGuide/AppThinning/AppThinning.html, 4 pp.

Solomon, "App Thinning in IOS 9 & NSBundlerSourceRequest," Mutual Mobile, Nov. 5, 2015, https://mutualmobile.com/posts/app-thinning-in-ios-9-nsbundleresourcerequest, 7 pp.

"Accessing and Downloading On-Demand Resources," Apple Inc., Oct. 21, 2015, from https://developer.apple.com/library/ios/documentation/FileManagement/Conceptual/On_Demand_Resources_Guide/Managing.html, 7 pp.

"On-Demand Resources Essentials," Apple Inc., Oct. 25, 2015, from https://developer.apple.com/library/ios/documentation/FileManagement/Conceptual/On_Demand_Resources_Guide/index.html#//apple_ref/doc/uid/TP40015083 . . . , 6 pp.

Allen et al., "Serialization Sets: A Dynamic Dependence-Based Parallel Execution Model," Principles and Practice of Parallel Programming, vol. 44 Issue 4, Apr. 2009, pp. 85-96.

Tarantino, "Prefetching/Preloading and Prerendering content with HTML," Blog: Jack of Spades https://jack.ofspades.com/prefetching-preloading-and-prerendering-content-with-html/, Jan. 4, 2015, 6 pp.

Karle, "Operating System Containers vs. Application Containers," Rising Stack Engineering, May 19, 2015, 13 pp.

"Docker Engine," Docker Inc., retrieved on Jan. 25, 2017, from https://www.docker.com/, 10 pp.

"Modern Application Architecture for the Enterprise | Delivering agility, portability, and control with Docker Containers as a Service (CaaS)," Docker Inc., Jan. 21, 2016, 6 pp.

Engberg et al., "Privacy Authentication—Persistent Non-Identification in Ubiquitous Environments," Open Business Innovation, Aug. 18, 2002, 6 pp.

Shende, "Enhancing Privacy in Intercloud Interaction," IRF International Conference, Apr. 27, 2014, 185 pp.

"About Bundles," Apple Inc., Jun. 30, 2015, from https://developer.apple.com/library/mac/documentation/CoreFoundation/Conceptual/CFBundles/AboutBundles/AboutBundles.html, 6 pp.

"12 Applet Development Guide," Oracle Inc., retrieved on Dec. 29, 2015, from https://docs.oracle.com/javase/8/docs/technotes/guides/deploy/applet_dev_guide.html, 13 pp.

"Class Loading," Oracle Inc., retrieved on Dec. 29, 2015, from http://docs.oracle.com/javase/jndi/tutorial/beyond/misc/classloader.html, 4 pp.

"Docker (software)," Wikipedia, retrieved on Dec. 29, 2015, from https://en.wikipedia.org/wiki/Docker_(software), 6 pp.

"Is Applet jar downloaded by browser or by JVM?," Stack Overflow, Jun. 25, 2011, from http://stackoverflow.com/questions/6475838/is-applet-jar-downloaded-by-browser-or-by-jvm, 2 pp.

Venners, "Security and the Class Loader Architecture," JavaWorld, Aug. 1997, http://www.artima.com/underthehood/classloaders.html, 9 pp.

McGraw et al., "The Base Java Security Model: The Original Applet Sandbox," Ch. 2 Sec. 7, John Wiley & Sons, Inc., retrieved on Jan. 25, 1997, from http://www.securingjava.com/chapter-two/chapter-two-7.html, 7 pp.

Kleyman, "Understanding Application Containers and OS-Level Virtualization," Data Center Knowledge, retrieved on Jan. 5, 2015, from http://www.datacenterknowledge.com/archives/2015/01/05/understanding-application-containers-and-os-level-virtualization/, 3 pp.

"Multi Class Java Applet," Stack Overflow, Mar. 14, 2011, from http://stackoverflow.com/questions/5294872/multi-class-java-applet/2#2, 2 pp.

Vaughn-Nichols, "What is Docker and why is it so dam popular," ZDNet, Aug. 4, 2014, retrieved from http://www.zdnet.com/article/what-is-docker-and-why-is-it-so-dam-popular/, 10 pp.

Horstmann et al, "Core JAVA 2 vol. 1—Fundamentals," Sun Microsystems Inc., Dec. 18, 2000, pp. 624.

"NSBundleResourceRequest," Apple Inc., Sep. 16, 2015, from https://developer.apple.com/library/ios/documentation/Foundation/Reference/NSBundleResourceRequest_Class/, 2 pp.

U.S. Appl. No. 15/406,502, filed by Kirkpatrick, filed on Jan. 13, 2017.

(56) References Cited

OTHER PUBLICATIONS

U.S. Appl. No. 15/406,511, filed by Kirkpatrick, filed on Jan. 13, 2017.
U.S. Appl. No. 15/406,527, filed by Kirkpatrick, filed on Jan. 13, 2017.
U.S. Appl. No. 14/997,167, filed by Kirkpatrick, filed on Jan. 15, 2017.
International Search Report and Written Opinion of International Application No. PCT/US2017/013542, dated Mar. 30, 2017, 15 pp.
Response to Written Opinion dated Mar. 30, 2017, from international application No. PCT/US2017/013542, filed Nov. 6, 2017, 11 pp.
Second Written Opinion of International Application No. PCT/US2017/013542, dated Dec. 15, 2017, 7 pp.
Notice of Allowance from U.S. Appl. No. 15/406,511, dated Mar. 14, 2018, 9 pp.
Response to the combined search and examination report dated Jun. 14, 2017, from UK Application No. 1622159.0, filed Mar. 13, 2018, 36 pp.
Combined Search Report and Written Opinion from UK Intellectual Property Office for Application No. GB1622159.0, dated Jun. 14, 2017, 7 pp.
Notice of Allowance from U.S. Appl. No. 14/997,167, dated Mar. 29, 2017, 9 pp.
Kinney, "Getting started with Microsoft Application Virtualization", TechNet Magazine Nov. 2008. Retrieved from the Internet: <https://technet.microsoft.com/en-us/library/2008.10.appv.aspx?f=255&MSPPError=-2147217396> 4 pp.
"Microsoft App-V", Wikipedia, the free Encyclopedia, revised on Jan. 29, 2010. Retrieved from the Internet: <https://en.wikipedia.org/wiki/Microsoft_App-V> 5 pp.
Yang et al., "Application Streaming: A Mobile Application Distribution Method", School of Information Science and Engineering, Central South University, Dec. 16, 2015. Retrieved from the Internet: <https://link.springer.com/chapter/10.1007/978-3-319-27119-4_21> 14 pp.
Kircher et al., "Pooling", Corporate Technology, Siemens AG, May 10, 2003. Retrieved from the Internet: <http://www.kircher-schwanninger.de/michael/publications/Pooling.pdf> 11 pp.
Notice of Allowance from U.S. Appl. No. 15/406,511, dated May 24, 2018, 7 pp.
International Preliminary Report on Patentability from International Application No. PCT/US2017/013542, dated Mar. 29, 2018, 15 pp.
International Preliminary Report on Patentability from International Application No. PCT/US2016/068380 dated Jul. 26, 2018, 11 pp.
Office Action from U.S. Appl. No. 15/804,745, dated Jan. 28, 2019, 7 pp.
U.S. Appl. No. 16/254,526, filed Jan. 22, 2019.
Response to Office Action dated Jan. 28, 2019 from U.S. Appl. No. 15/804,745, filed Apr. 8, 2019, 2 pp.

\* cited by examiner

APPLICATION CONTAINERS

This application claims the benefit of U.S. Provisional Patent Application No. 62/279,571, filed Jan. 15, 2016, the entire content of which is hereby incorporated by reference.

BACKGROUND

Computing devices can perform various functions, such as executing applications, receiving user input, and outputting information for display. For instance, computing devices may execute applications, such as an email client, travel assistant, messaging client, and the like. An application may include one or more executable components that implement various functionality. In some distributed environments, a user computing device (e.g., a smartphone) may use a media store application to search for and install applications, which are provided by a remote computing system. Typically, when a user selects an application in the media store application to install at the user computing device, the remote computing system sends a single file that includes all of the executable components to perform all functionality of the application and the computing device must install the full application prior to being able to execute the application.

SUMMARY

In general, techniques of the present disclosure provide for an application container for application code without requiring modification to the underlying operating system. To the operating system, the application container appears to be the application itself even though, without any application code executing within the application container, the application container is not a standalone functional application. In some examples, the application container may provide a self-contained execution environment for an application comprised of multiple sub-packages and each sub-package includes one or more executable components. In other words, the application container may manage dynamic loading of application sub-packages and dependencies.

As an example, a software developer may design an application (e.g., a navigation application) with discrete sets of functionality. The navigation application may include a turn-by-turn navigation user interface, a point-of-interest user interface (e.g., displaying details for a point of interest on a map), and a settings user interface. The software developer may design the application with three different sub-packages, where each sub-package includes a set of executable components to implement the functionality for the respective user interface. However, because each of the sub-packages operate within the same application container, the sub-packages can communicate with other sub-packages as if they are included within a single sub-package as the sub-packages within the same application container may be part of the same operating system process and share the same memory space. In contrast, distinct application containers communicate as completely distinct applications using inter-process communication. In this way, techniques of this disclosure may reduce application installation and loading time while also increasing security by ensuring that different applications communicate using inter-process communication, all without requiring changes to the underlying operating system.

In one example, a method includes receiving, by a supervisor component executing at a computing device, a request to execute an application, and determining, by the supervisor component, whether any application container is currently allocated for the application. The method may also include, responsive to determining that an application container is currently allocated for the application: activating, by the supervisory, the application container currently allocated for the application, and executing, by the application container for the application, the application, and, responsive to terminating execution of the application, deactivating, by the supervisor component, the application container for the application.

In another example, a computing device includes one or more storage components that store a supervisor component and one or more processors. The one or more processors execute the supervisor component to receive a request to execute an application, determine whether any application container is currently allocated for the application, and, responsive to determining that an application container is currently allocated for the application, activate the application container currently allocated for the application. The one or more processors execute the supervisor component to, in response to the application ceasing execution, deactivate the application container for the application.

In another example, non-transitory computer-readable storage medium encoded with instructions that, when executed by one or more processors of a computing device, cause the one or more processors to receive a request to execute an application, and determine whether any application container is currently allocated for the application. The instructions further cause the one or more processors to, responsive to determining that an application container is currently allocated for the application: activate the application container currently allocated for the application and execute, using the application container, the application, and, responsive to terminating execution of the application, deactivate the application container for the application.

In another example, an apparatus include means for receiving a request to execute an application, determining whether any application container is currently allocated for the application, and, responsive to determining that an application container is currently allocated for the application, activating the application container currently allocated for the application. The apparatus further includes means for executing the application. The apparatus also includes means for, responsive to terminating execution of the application, deactivating the application container for the application.

The details of one or more examples are set forth in the accompanying drawings and the description below. Other features, objects, and advantages of the disclosure will be apparent from the description and drawings, and from the claims.

DETAILED DESCRIPTION

Figure 1:
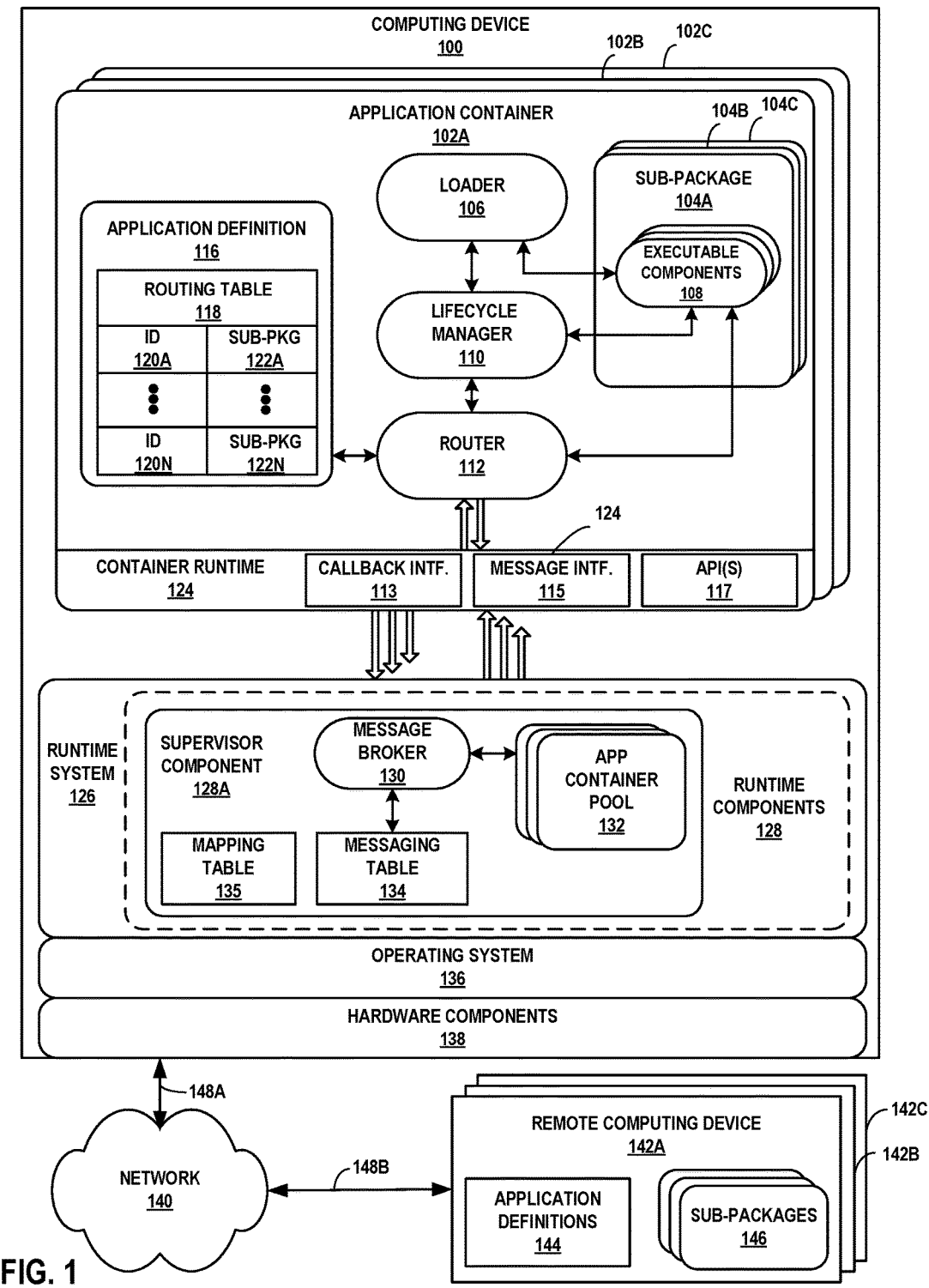
FIG. 1 is a conceptual diagram illustrating an example computing device with application containers, in accordance with techniques of this disclosure.

FIG. 1 is a conceptual diagram illustrating an example computing device 100 with application containers 102A-102C ("application containers 102"), in accordance with techniques of this disclosure. Examples of computing device 100 may include, but are not limited to, portable or mobile devices such as mobile phones (including smart phones), laptop computers, tablet computers, wearable computing devices such as smart watches or computerized eyewear, smart television platforms, cameras, personal digital assistants (PDAs), etc. In some examples, computing device 102 may include stationary computing devices such as desktop computers, servers, mainframes, etc.

As shown in FIG. 1, computing device 100 includes application containers 102, system runtime 126, operating system 136, and hardware components 138. Computing device 100 may communicate with one or more other remote computing devices 142A-142C ("remote computing devices 142") via network 140 and communication links 148A-148B. As shown in FIG. 1, network 140 represents any public or private communication network, for instance, a cellular, Wi-Fi, and/or other type of network for transmitting data between computing devices. Computing device 100 and remote computing devices 142 may send and receive data across network 140 using any suitable communication techniques. For example, computing device 100 may be operatively coupled to network 140 using communication link 148A. Remote computing device 142A may be operatively coupled to network 140 by communication link 148B. Network 140 may include network hubs, network switches, network routers, etc., that are operatively inter-coupled thereby providing for the exchange of information between computing device 102 and remote computing devices 142. In some examples, communication links 138A-138B may be Ethernet, ATM or other network connections. Such connections may be wireless and/or wired connections.

Hardware components 138 may include but are not limited to computer processors, communication units (e.g., modems, network interface controllers, and the like), input components, output components, a presence-sensitive display, volatile and non-volatile memories, and a power source to name only a few examples. Operating system 136 may execute on hardware components 138 and manage hardware and software components of computing device 100. For instance, operating system 136 may perform memory management, process scheduling and non-volatile storage management. Operating system 136 may also provide network and security services to applications executing at computing device 100. Operating system 136 may also perform more or fewer functions than described above.

Runtime system 126 implements an execution model for applications that are built according to a particular programming language in which the applications are written and built or compiled. Runtime system 126 may include one or more libraries and/or services that are accessible to application containers 102 during execution. As further described in this disclosure, each of application containers 102 may correspond to a distinct application. Runtime system 126 may include thread-management services, screen drawing and user-interface rendering component, and inter- and intra-application messaging services to name only a few example services. Application containers 102 may access the services through Application Programming Interfaces (APIs) that are exposed by runtime components 128. In some examples, runtime system 126 may be executed as one or more processes and/or threads. One or more of the processes and/or threads may execute with or without operating system privileges.

As shown in FIG. 1, runtime system 126 may include runtime components 128. Each distinct runtime component may be implemented with one or more processes and/or threads. In some examples, each distinct runtime component may provide a user-defined set of functionality. For instance, a user-interface rendering component may be implemented with one or more libraries that define user-interface elements (e.g., buttons, lists, images, input fields, and the like) and their corresponding behaviors. The user-interface rendering component may provide APIs, which are called by application containers 102 to render the user-interface elements in a graphical user interface.

Supervisor component 128A is included in runtime components 128 and may, in some examples, execute as a privileged component (i.e., execute with increased permissions relative to other, non-privileged components executing at computing device 100). Supervisor component 128A performs installation and maintenance of application containers 102 and provides inter- and intra-application messaging services. Supervisor component 128A includes a message broker 130 that listens for messages generated by application containers 102 and performs actions for the sending application container or one or more other application containers. Supervisor component 128A may have first priority or the first opportunity at dispatching any message (e.g., a message containing a URI as a user-specified identifier). In some examples, message broker 130 may provide additional processing for messages, such as allocating application containers from application container pool 132, enforcing security for messages, and logging messages, to name only a few examples. As an example, application container 102A may generate a message to navigate from a first user interface to a second user interface within the same application. Application container 102A may send the message to message broker 130, which includes a messaging table 134 comprising a set of filters, where each filter has one or more conditions and one or more corresponding actions. If the content of the message matches a condition of a filter, message broker 130 may execute the corresponding action, such as executing instructions to output the second graphical user interface. In some examples, such messages described above may be routed internally by router 112 without forwarding the messages to message broker 130.

In some examples, supervisor component 128A ensures that at least one application container is included in application container pool 132 and ready to be woken up. Each application container included in application container pool 132 are not currently allocated to a particular application and are not currently executing application code. However, each application container included in application container pool 132 includes enough bootstrapping code to be able to load and run application code when supervisor component 128A wakes up the particular application container and assigns the particular application container to a particular application. The particular application container from application container pool 132 receives instructions from supervisor component 128A to begin loading and running the application code for the particular application.

As described above, each of application containers 102 may correspond to a distinct application at the time the corresponding application is executing. In various instances, supervisor component 128A maintains a mapping of which application containers are mapped to which executing applications in mapping table 135. Mapping table 135 may be any data structure suitable for storing mapping information between two items. Applications may include distinct functionality to perform operations on computing device 100. For instance, applications may include an email application, text messing application, instant messaging application, weather application, video conferencing application, social networking application, weather application, stock market application, emergency alert application, sports application, office productivity application, multimedia player, to name only a few examples.

As a user or operating system invokes particular applications, supervisor component 128A dynamically allocates application containers 102 from application container pool 132 and maintains a mapping of the particular application containers 102 to the corresponding applications in mapping table 135. When an application is terminated, supervisor component 128A may clean up any application containers 102 that are no longer needed. For example, supervisor component 128A may reset a state of application container 102B or may uninstall application container 102B that was mapped to a now terminated application. Further, supervisor component 128A may remove or invalidate the entry in mapping table 135 for the particular mapping between the application and application container 102B. In examples where supervisor component 128A uninstalls application containers 102 that are no longer mapped to an actively executing application, supervisor component 128A may install new applications containers and add them to application container pool 132 to ensure that at least one application container is ready to be woken up in response to invocation of an application. In this way, the user-interactive latency of application installation may be reduced to zero or nearly zero while, from the operating system perspective, maintaining separate identities for each application.

As shown in FIG. 1, application container 102A provides an execution environment and supporting services to direct the execution of executable components 108 of an application. In general, each of application containers 102 includes enough bootstrapping code to be able to load and run application code for an application. That is, each of application containers 102 include program code that loads and executes one or more installable sub-packages of the application. Each of application containers 102 accepts instructions from supervisor 128A to begin loading and executing application code. However, each of application containers 102 are not shown on a home screen graphical user interface of computing device 100 and are, in general, not readily visible to a user of computing device 100.

Each of application containers 102 may execute as separate processes in operating system 136. In some examples, application container 102A includes a messaging interface 115. Router 112 may receive messages from runtime system 126 via messaging interface 115, and runtime system 126 may receive messages from executable components 108 and router 112 via messaging interface 115. Program logic for application container 102A may be implemented in executable components 108. An executable component may be a logical grouping of machine-executable code. For instance, in object-oriented design, a single executable component may be a single, compiled class file that includes machine-executable code.

Application container 102A may be a vessel for one or more sub-packages 104. In some examples, a sub-package includes two or more executable components 108. A sub-package may include resources (e.g., images, text, videos or any other non-compiled data), security and/or signing information, version information and/or dependency information, or any other information for an application. A software developer may design an application to be comprised of multiple, user-defined sub-packages. Each user-defined sub-package may include set of executable components that collectively provide a discrete set of functionality. For instance, a software developer may design a navigation application with multiple different user interfaces. Each user interface may include a different set of user interface elements and corresponding behaviors. As such each user interface may be implemented with a distinct set of executable components. For instance, the navigation application may include a turn-by-turn navigation user interface, a point-of-interest user interface (e.g., displaying details for a point of interest on a map), and a settings user interface. The software developer may design the application with three different sub-packages, where each sub-package includes a set of executable components to implement the functionality for the respective user interface.

Application container 102A may include container runtime 124. Container runtime 124 may include one or more libraries and/or one or more Application Programming Interfaces (APIs) 117 to services and/or functions that are provided by libraries within container runtime 124, runtime system 126, and/or operating system 136. As such, container runtime 124 may provide a secure in-process API layer. That is, each of application containers 102 shares a process and address space with the application code for the particular application to which the application container is mapped. By sharing the process and address space, application containers 102 may simplify method call semantics between application code and shared API code. That is, rather than requiring a developer to use blocking interprocess communication calls, the developer may directly utilize APIs 117.

By controlling the application container and container runtime, runtime system 126 can proxy API calls and verify that application container and container runtime have not been tampered with and therefore provide runtime logic for sensitive behavior. For instance, an application that requests access a user's device identifier (e.g., a globally unique identifier of the device) could be required to call through APIs of the container runtime, which could then check with supervisor component 128A to ensure this is allowed behavior or even to modify the output of that API (say scrubbing or pseudonymizing personally identifying information). In general, application containers 102 may permit some direct access to operating system 136, may permit some indirect action via the proxying, and may also block access to certain APIs. In this way, container runtime 124 may enforce a guarantee that such checks occur various operations because such operations could only be made through APIs of container runtime 124. Further, because container runtime 124 of application containers 102 provide APIs 117, updates to application containers 102 may be performed via an application update rather than requiring an update to the underlying operating system 136, which may increase the adoption rate of any such updates, which may, in turn, increase security of the operating platform.

Container runtime 124 may also provide a layer to iterate on APIs that require platform coordination. For instance, sub-package could declare that it requires some particular data, such as location, and container runtime 124 could obtain the location in parallel with loading executable components for a particular sub-package and provide the location as an argument on startup of an application. As one example, a developer may specify, in metadata for an application, that some dependent data is required for execution of the application. Container runtime 124 may not only retrieve and begin executing the application code for the application, but may also, in parallel, identify and retrieve the dependent data. In some instances, the developer may specify whether the dependent data is mandatory (i.e., required for the application to execute) or "best effort" (i.e., improves operation/functionality of the application, but not strictly required for the application to execute). An example of mandatory dependent data may be data that is required to display a basic user interface for the application. For "best effort" dependent data, container runtime 124 may begin executing the application code as soon as the application code is downloaded and available to execute, even if container runtime 124 has not yet received the "best effort" dependent data.

Container runtime 124 may automatically determine and proactively retrieve data for an application. For example, while an application may have a hierarchical structure explicitly defined in the metadata by the developer, in various examples, the developer need not define the application structure in the metadata. Instead, container runtime 124 may analyze the application code, determine data likely needed by the application, optimistically retrieve that data needed by the application without a developer specifying the data dependencies. That is, application containers 102 may obviate the need for static libraries in some cases by providing runtime dependency satisfaction. Because application code is run by application containers 102, container runtime 124 can first determine through understanding of application metadata, dependencies of the application, including relevant versioning rules, satisfy those dependencies, and then begin executing the application code. Further, because application containers 102 and runtime system 126 operated outside of operating system 136, operating system 136 need not be modified in order to support the techniques of this disclosure.

Techniques of this disclosure may also enable container runtime 124 to perform optimistic prefetching of additional application code and data dependencies of the additional code. In some instances, container runtime 124 may predict additional code likely be needed to provide certain functionality of the application (e.g., for commonly used feature) and proactively retrieve the additional code. For example, container runtime 124 may predict that a user who loads a navigation application is likely to also request directions, the functionality for which may be in a different sub-package from the sub-package that provides the initial user interface for the navigation application. Container runtime 124 may retrieve the additional code (e.g., download one of sub-packages 146 from remote computing device 142A, load a sub-package 104 stored at computing device 100, etc.), identify any data dependencies of the additional code, and pre-fetch the data dependencies of the additional code. In other words, container runtime 124 may determine application code likely to be needed by application container 102 and fetch it while also fetching data on which the code is dependent. In contrast, systems which just pre-fetch the code wait to fetch required data until that code actually is executed.

As further described below, by allowing the software developer to design an application with separate sub-packages for separate sets of functionality, application containers 102 may enable an application to execute at computing device 100 without all of its respective execution components for all of its sub-packages being locally resident on computing device 100. In this way, the initial execution of an application may not require the retrieval and/or installation of all sub-packages but rather only a subset of sub-packages that include executable components implementing the requested functionality. Moreover, by packaging multiple, executable components in a single sub-package, the retrieval and/or installation of executable components may occur on a sub-package basis according to requested functionality (e.g., to render a particular user interface) rather retrieving and installing executable components on an executable component-by-executable component basis, which may have poorer performance and/or result in a poorer user experience.

As described above, each application may be executed with an application container that includes one or more executable components that define the operations of the application. Application container 102A includes a router 112 that sends and receives messages, which change the behavior of the application and/or cause the application to perform one or more operations, with executable components 108 and messaging interface 115. For instance, router 112 may receive a message that requests the execution of one or more operations. Router 112 may determine, based on the contents of the message, whether a sub-package that includes executable components to perform the one or more operations are stored locally or are otherwise accessible on computing device 100. The contents of the message may include an identifier such as a Uniform Resource Identifier (URI) that corresponds to the sub-package. If the sub-package is stored locally or is otherwise accessible on computing device 100, then router 112 identifies one or more executable components to perform the operations based on contents of the message. In some examples, the message may include additional attributes (e.g., category for launching user interface, MIME type of data, explicit component class for execution) or data (e.g., user data or machine generated data) that further specify the one or more operations to perform. As such, the one or more executable components identified by router 112 may perform the one or more operations based on the additional attributes or data.

As described above, all of the sub-packages for a particular application need not be locally resident at computing device 100 to execute the application. To determine whether a sub-package for specific functionality is resident or otherwise accessible at computing device 100, router 112 may perform a lookup on application definition 116. Application definition 116, generally, may define mappings between user-specified identifiers (e.g., URIs, strings, integers, or any other suitable identifier) and sub-packages that specify specific functionality for the application. Application definition 116 includes these mappings in routing table 118, which includes mappings between user-specified identifiers 120A-120N ("user-specified identifiers 120") and sub-package identifiers 122A-122N ("sub-package identifiers 122"). If router 112 receives a message with a user-specified identifier to perform functionality using a particular sub-package, router 112 may perform a lookup in router table 118. If router 112 determines that user-specified identifier 120A, for example, matches the user-specified identifier in the message, router 112 may determine whether sub-package 104A that corresponds to sub-package identifier 122A is resident on computing device 100. Since sub-package 104A is resident on computing device 100, router 112 executes a call to sub-package 104A based on the message or sends the message to sub-package 104A, which performs one or more operations using executable components 108A.

As described above, because the entire set of sub-packages for an application need not be stored locally on computing device 100, the initial installation and/or initial execution of an application at computing device 100 may require less time than if the entire application needed to be downloaded from a remote computing device, installed, and executed by computing device 100. As such, a user may experience greater responsiveness from the application and/or performance for the behavior of the application.

In the example of FIG. 1, a user may desire to initially install and execute an application, such as a navigation application. Initially, none of the sub-packages or the application definition for the navigation application may be stored at computing device 100. The user may provide a user input to computing device 100 to initially select an icon in a user interface provided by operating system 136 that corresponds to the navigation application. Alternatively, the user may select the navigation application in a media store application (not shown) that executes at computing device 100 and communicates with remote computing devices 142 to retrieve sub-packages and application definitions. In any case, message broker 130 of supervisor component 128A receives a message from operating system 136 or the media store application that requests execution of particular functionality for the navigation application. In some examples, because the navigation application is not yet installed, the particular functionality requested is to display the default or main user interface for the navigation application.

Supervisor component 128A may determine, based on the content of the message, whether one of application containers 102 has already been allocated in the memory of computing device 100 for the navigation application. For instance, the content of the message may include a unique identifier of the navigation application, such as the name of the navigation application. In response to determining that supervisor component 128A has not yet allocated one of application containers 102 to the navigation application, supervisor component 128A may allocate application container 102A from application container pool 132. Application container pool 132 may include a set of processes that are reserved for and usable by executing applications. In some examples, supervisor component 128A may communicate with operating system 136 to create a new process for application container 102A.

Supervisor component 128A may determine that the navigation application is not yet installed and request an application definition from one or more of remote computing devices 142. For instance, supervisor component 128A may send a message to remote computing device 142A, where the message includes an identifier for the navigation application that is globally unique in remote computing devices 142. Remote computing device 142A, upon receiving the message, selects application definition 116 from application definitions 144, and sends application definition 116 to computing device 100. Supervisor component 128A receives application definition 116, which may be included in or accessible to application container 102A.

Supervisor component 128A causes message broker 130 to send a message to application container 102A to display the default or main user interface for the application. In particular, the message may include a user-specified identifier that corresponds to a sub-package with functionality to display the default or main user interface for the application. In some examples, message broker 130 receives (or generates) the user-specified identifier based on information received from the media store application, or from bootstrapping functionality associated with the icon for the mapping application that was initially selected by the user. The bootstrapping functionality may include, but is not limited to, sending the user-specified identifier to message broker 130.

Router 112 receives the message with the user-specified identifier via messaging interface 115. In this example of FIG. 1, the user-specified identifier is 120A. Based on the user-specified identifier, router 112 determines that the sub-package for sub-package identifier 122A corresponding to user-specified identifier 120A is not stored locally at computing device 100. Router 112 may send a message, using container runtime 124 and/or runtime system 126, to remote computing device 142A to request the sub-package for sub-package identifier 122A. For instance, the message sent by container runtime 124 and/or runtime system 126 to remote computing device 142A may include sub-package identifier 122A. Remote computing device 142A may send a sub-package to computing device 100 comprising executable components for displaying the default or main user interface of the navigation application.

Router 112, in response to determining that the sub-package for sub-package identifier 122A is not stored locally, may cause lifecycle manager 110 to listen for system lifecycles calls via callback interface 113, where the lifecycle calls are issued by runtime system 126. Lifecycle calls may include starting an application, pausing an application, restarting an application, or terminating an application, to name only a few examples. Lifecycle manager 110 may buffer the lifecycle calls, which will be executed by the executable components of sub-package 104A, once computing device 100 has retrieved sub-package 104A from remote computing device 142A. Once sub-package 104A has been retrieved by computing device 100, lifecycle manager 110 may send each of the buffered lifecycle calls to sub-package 104A.

In the example of FIG. 1, upon lifecycle manager 110 determining that computing device 100 has retrieved and stored sub-package 104A locally, lifecycle manager 110 sends a call or otherwise invokes loader 106 to load one or more of executable components 108 into memory of computing device 100 in order to execute the particular functionality initially requested, e.g., display the default or main user interface for the application. In some examples, loader 106 is responsible for loading executable components into memory. In some examples, loader 106 may represent multiple loaders, where each loader is responsible for loading a different executable component into memory. Loader 106 may, for a particular executable component, locate corresponding libraries used by the particular executable component and load any such libraries into memory, such that the libraries are accessible to the particular executable component. Lifecycle manager 110 may also send the buffered lifecycle calls to one or more of executable components 108. Upon receiving the buffered lifecycle calls, the one or more of executable components 108 cause computing device 100 to display the default or main user interface for the application.

At a later time, if the user wishes to navigate to a settings user interface, the user may provide a user input that selects a user interface element (e.g., icon, button, label, or the like) for the settings in the currently displayed default or main user interface for the application. Runtime system 126 sends a message to application container 102A that indicates the selection of the user interface element. Executable component 108A determines that the selection displays the settings user interface. Executable component 108A generates a message with a user-specified identifier 120N for sub-package 122N that includes the functionality for the settings user interface. Executable component 108A may send the message to router 112 directly, or to runtime system 126, which in turn routes the message back to router 112. In either case, router 112 performs a lookup of user-specified identifier 120N and determines that the sub-package for sub-package identifier 122N is not locally stored at computing device 100.

In a similar to manner, as described above with respect to sub-package 104A, router 112 sends a message, using container runtime 124 and/or runtime system 126, to remote computing device 142A to retrieve the sub-package for sub-package identifier 122N. Remote computing device 142A may send sub-package 122N to computing device 100 comprising executable components for displaying the settings interface of the navigation application. While computing device 100 is retrieving sub-package 122N, lifecycle manager 110 may buffer lifecycle calls received at callback interface 113. Upon downloading sub-package 122N, lifecycle manager 110 causes loader 106 to load executable components of sub-package 122N into memory. Loader 106 may initiate execution of one or more of the executable components to cause the settings interface of the navigation application to be displayed at a display device of computing device 100.

After the navigation application is terminated, supervisor component 128A may deallocate application container 102A. For example, supervisor component 128A may remove the mapping of the navigation application to application container 102A from mapping table 135. Supervisor component 128A may also reset the state of application container 102A to a default state. In some examples, supervisor component 128A may terminate the process associated with application container 102A, thereby terminating execution of application container 102A. While supervisor component 128A may deallocate application container 102A at nearly the same time as the navigation application is terminated, in some examples, supervisor component 128A may maintain application container 102A (i.e., refrain from deallocating application container 102A) until additional application containers 102 are need for other applications, computing device 100 needs additional free memory, or other event occurs requiring deallocation of application container 102A. By refraining from deallocating application container 102A for a period of time after termination of the navigation application, supervisor component 128A may reuse application container 102A the next time the navigation application is executed, which may even further reduce the amount of time required to load and execute the navigation application. In this way, at some time after termination of the navigation application, supervisor component 128A may deallocate application container 102A and return application container 102A to application container pool 132 for future use.

Figure 2:
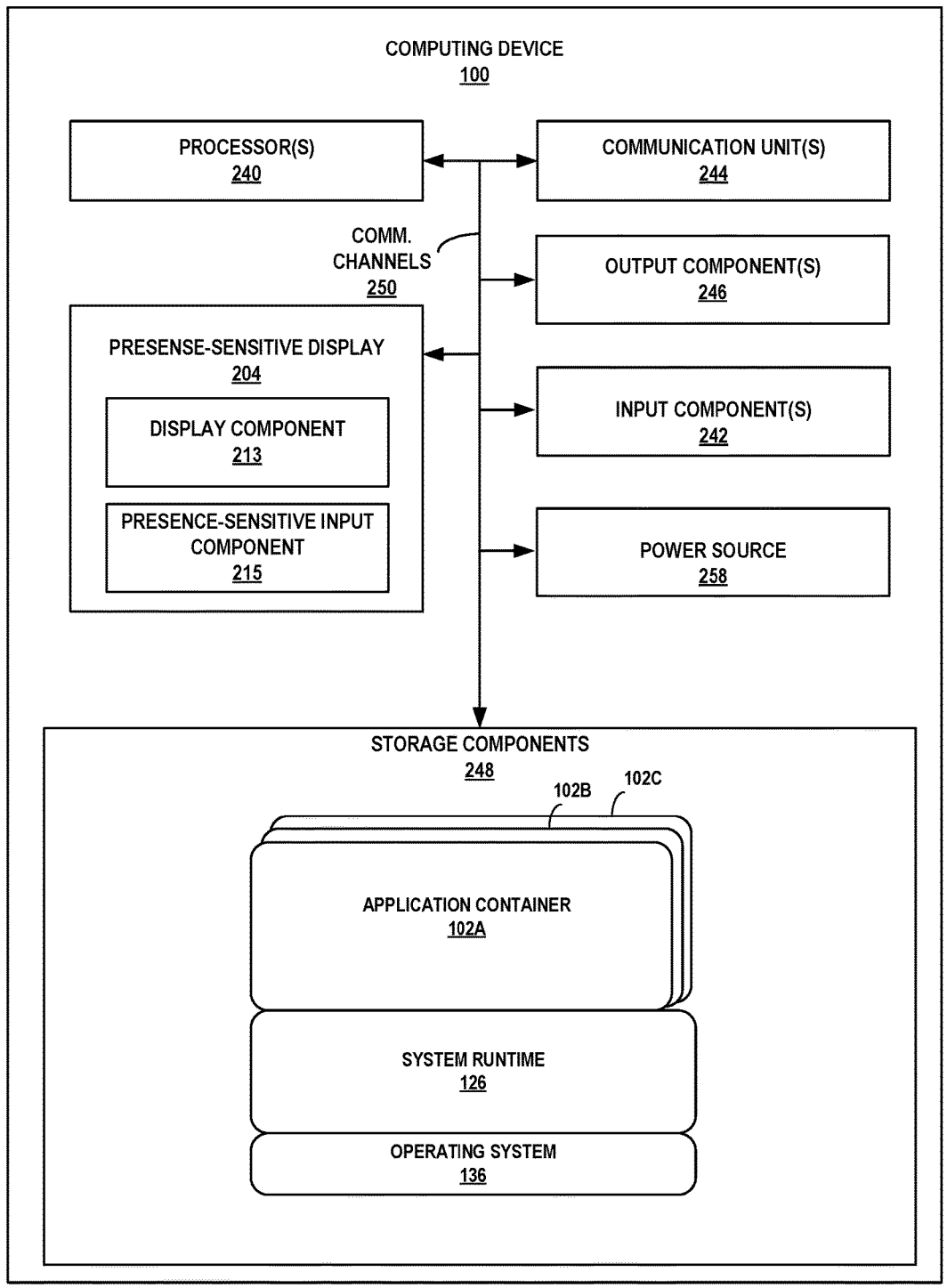
FIG. 2 is a block diagram illustrating further details of a computing device, in accordance with one or more aspects of the present disclosure.

FIG. 2 is a block diagram illustrating further details of computing device 100, in accordance with one or more aspects of the present disclosure. FIG. 2 illustrates only one particular example of computing device 100. Many other examples of computing device 100 may be used in other instances and may include a subset of the components included in example computing device 100 or may include additional components not shown example computing device 100 in FIG. 2.

As shown in the example of FIG. 2, computing device 100 includes one or more processors 240, one or more input components 242, one or more communication units 244, one or more output components 246, one or more storage devices 248, and presence-sensitive display 252. Storage devices 248 of computing device 100 include application containers 102, system runtime 128, and operating system 136. Communication channels 250 may interconnect each of the components 240, 242, 244, 246, 248, 252, 254, and/or 256 for inter-component communications (physically, communicatively, and/or operatively). In some examples, communication channels 250 may include a system bus, a network connection, one or more inter-process communication data structures, or any other components for communicating data between hardware and/or software.

One or more processors 240 may implement functionality and/or execute instructions within computing device 100. For example, processors 240 on computing device 100 may receive and execute instructions stored by storage devices 248 that provide the functionality of operating system 136, application containers 102, and system runtime 126. These instructions executed by processors 240 may cause computing device 100 to store and/or modify information, within storage devices 248 during program execution. Processors 240 may execute instructions of operating system 136, application containers 102, and system runtime 126 to perform one or more operations. That is, operating system 136, application containers 102, and system runtime 126 may be operable by processors 240 to perform various functions described in this disclosure.

One or more input components 242 of computing device 100 may receive input. Examples of input are tactile, audio, kinetic, and optical input, to name only a few examples. Input components 242 of computing device 100, in one example, include a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more output components 246 of computing device 100 may generate output. Examples of output are tactile, audio, and video output. Output components 246 of computing device 100, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

In some examples, presence-sensitive display 252 of computing device 100 may include functionality of input component 242 and/or output components 246. In the example of FIG. 2, presence-sensitive display 252 may include a presence-sensitive input component 256, such as a presence-sensitive screen or touch-sensitive screen. In some examples, presence-sensitive input component 256 may detect an object at and/or near the presence-sensitive input component. As one example range, presence-sensitive input component 256 may detect an object, such as a finger or stylus that is within two inches or less of presence-sensitive input component 256. Presence-sensitive input component 256 may determine a location (e.g., an (x,y) coordinate) of the presence-sensitive input component at which the object was detected. In another example range, presence-sensitive input component 256 may detect an object two inches or less from presence-sensitive input component 256 and other ranges are also possible. Presence-sensitive input component 256 may determine the location of presence-sensitive input component 256 selected by a user's finger using capacitive, inductive, and/or optical recognition techniques.

In some examples, presence-sensitive display 252 may also provide output to a user using tactile, audio, or video stimuli as described with respect to output component 246. For instance, presence-sensitive display 252 may include display component 254 that presents a graphical user interface. Display component 254 may be any type of output component that provides visual output, such as described with respect to output components 246. While illustrated as an integrated component of computing device 100, presence-sensitive display 252 may, in some examples, be an external component that shares a data path with other components of computing device 100 for transmitting and/or receiving input and output. For instance, presence-sensitive display 252 may be a built-in component of computing device 100 located within and physically connected to the external packaging of computing device 100 (e.g., a screen on a mobile phone). In another example, presence-sensitive display 252 may be an external component of computing device 100 located outside and physically separated from the packaging of computing device 100 (e.g., a monitor, a projector, etc. that shares a wired and/or wireless data path with a tablet computer). In some examples, presence-sensitive display 252, when located outside of and physically separated from the packaging of computing device 100, may be implemented by two separate components: a presence-sensitive input component 256 for receiving input and a display component 254 for providing output.

One or more communication units 244 of computing device 100 may communicate with external devices by transmitting and/or receiving data. For example, computing device 100 may use communication units 244 to transmit and/or receive radio signals on a radio network such as a cellular radio network. In some examples, communication units 244 may transmit and/or receive satellite signals on a satellite network such as a Global Positioning System (GPS) network. Examples of communication units 244 include a network interface card (e.g. such as an Ethernet card), an optical transceiver, a radio frequency transceiver, a GPS receiver, or any other type of device that can send and/or receive information. Other examples of communication units 244 may include Bluetooth®, GPS, 3G, 4G, and Wi-Fi® radios found in mobile devices as well as Universal Serial Bus (USB) controllers and the like.

As shown in FIG. 2, computing device 100 may include a power source 258. In some examples, power source 258 may be a battery. Power source 258 may provide power to one or more components of computing device 100. Examples of power source 258 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 258 may have a limited capacity (e.g., 1000-3000 mAh).

One or more storage devices 248 within computing device 100 may store information for processing during operation of computing device 100. In some examples, storage device 248 is a temporary memory, meaning that a primary purpose of storage device 248 is not long-term storage. Storage devices 248 on computing device 100 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 may be configured to store larger amounts of information than volatile memory. Storage devices 248 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or data associated with operating system 136, system runtime 126, and application containers 102.

Each respective application container 102 may correspond to a distinct application. For instance, an operating system may include a user interface that allows a user to select different applications (e.g., from a menu or icon grid) based on respective icons that correspond to the different applications. For example, a user may select an email client icon from the operating system user interface that causes execution of the email client application with its own separate application container. Unlike an application container, an extension or other sub-application (e.g., plugins, JavaScript, Java Virtual Machine, etc.,) of a web-browser may not be represented as a separate application to be launched in a user interface of an operating system. For instance, even if a web browser created a separate process for each tab of a tabbed interface, each of the tabs may not be represented as a separate application within a user interface of the operating system as different launchable applications.

An application container, as described in this disclosure, may differ from a web browser because an application container may include a container runtime. As described in this disclosure, a container runtime of an application container may include libraries, but may also expose operating system APIs to executable components of sub-packages within an application container. Unlike an application container, a web browser may not expose, and may even prevent access to, such operating system APIs to extensions or other sub-applications within the web-browser.

An application container, as described in this disclosure, may differ from a web browser because the application container may receive user-specified identifiers (e.g., URI's) from a supervisor component (e.g., in a runtime system or operating system) that is external to the application container that may cause the retrieval of sub-packages that change the execution behavior or appearance of the application without additional user intervention. The user-specified identifiers may originate from other applications executing on the same computing device or different computing devices, and upon being received by an application container may automatically change the execution behavior or appearance of the application. By contrast, a web browser may receive user input (e.g., inputting text for a URL) within the web-browser itself and not from a source external to the application container, e.g., either a supervisor component or another application external to the web-browser. Additionally, a web browser may not include a router and/or application definition, as described within an application container of this disclosure, to perform a lookup of user-specified identifiers and change the execution of the application represented by the application container. Unlike an application container, a web browser may not include a callback interface, which receives and buffers lifecycle calls to change the operation of sub-packages within the application container.

In some examples, a web browser may include core functionality (e.g., rendering engine) and one or more third-party extensions, plugins, and/or sub-application. A web browser, unlike an application container, may not function properly or execute at all without all of the web browser's core functionality being stored locally and available to the computing device for execution. By contrast, an application container may function properly with only a subset of its core functionality (e.g., only sub-packages for a subset of user interfaces) stored locally and available to the computing device for execution.

In accordance with techniques of the disclosure, system runtime 126 receives a request to execute an application. For instance, a user may provide a user input at presence-sensitive display 204 to execute the application or particular functionality of the application. Presence-sensitive display 204 may cause supervisor component 128A to generate an event that corresponds to selection of an icon for the application. In response to receiving an indication of the user input, supervisor component 128A may determine whether at least one of application containers 102 is allocated for the application.

Responsive to determining that an application container for maintaining installable sub-packages of the application is not allocated in volatile memory of storage components 248, supervisor component 128A retrieves an application definition from a remote computing device. For instance, supervisor component 128A causes one of communication units 244 to send a request to the remote computing device for the application definition. The application definition may define a plurality of mappings between the installable sub-packages of the application and user-specified identifiers.

Responsive to allocating application container 102A in the volatile memory of computing device 100 or to determining that application container 102A was already allocated in the memory of computing device 100, supervisor component 128A may activate application container 102A to initiate execution of the application. For example, supervisor component 128A may initiate execution of application container 102A, causing a process for application container 102A to begin executing. Supervisor component 128A may also map application container 128A to the application (e.g., by adding an entry to mapping table 135). In order to initiate execution of the application using application container 102A, supervisor component 128A provides an indication of the application to application container 102A so that application container 102A is configured to execute the desired application. In instances where application container 102A was previously allocated to the application and has a corresponding process that is suspended, supervisor component 128A may resume execution of the suspended process. Once application container 102A is activated, application container 102A may execute the application.

If the application terminates (e.g., by the user or other mechanism), supervisor component 128A may deactivate application container 102A for the application. As described above, deactivating application container 102A may include one or more of suspending the process associated with application container 102A, terminating execution of application container 102A, removing the mapping between the application and application container 102A (e.g., from mapping table 135), etc.

Figure 3:
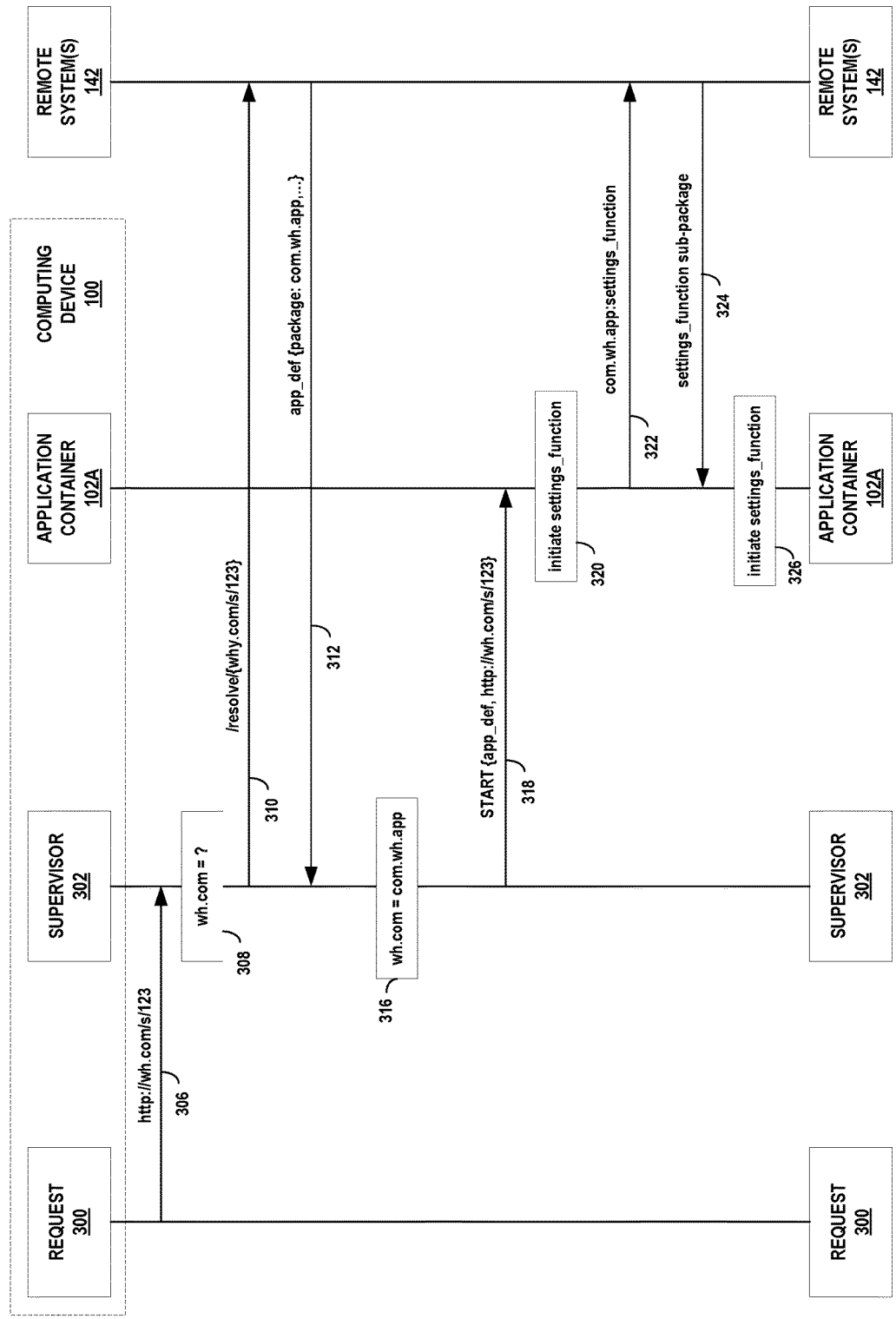
FIG. 3 is a sequence diagram illustrating example operations of a computing device with application containers for dynamically loading installable sub-packages, in accordance with techniques of this disclosure.

FIG. 3 is a sequence diagram illustrating example operations of a computing device with application containers for dynamically loading installable sub-packages, in accordance with techniques of this disclosure. For purposes of illustration only, the example operations are described below within the context of computing device 100 and remote computing system 142 of FIG. 1.

As shown in FIG. 3, computing device 100 may initially detect or receive a request 300 to initiate particular functionality of computing device 100. For instance, the user may provide a user input to computing device 100 to initially select an icon that corresponds to the application, which for purposes of FIG. 3 is a navigation application. Alternatively, the user may select the navigation application in a media store application that executes at computing device 100 and communicates with remote computing systems 142 to retrieve sub-packages and application definitions. Supervisor 302 may receive the request. In FIG. 3, the request may include a user-specified identifier http://wh.com/s/123. The user specified identifier may be a Uniform Resource Locator (URL). The URL includes a sub-identifier wh.com that is a globally unique identifier in remote computing systems 142 for the navigation application as described in this disclosure.

Supervisor 302 may determine whether one or more sub-packages for the navigation application are stored at computing device 100 (308). If no sub-packages for the navigation application are stored at computing device 100, computing device 100 submits a request to resolve the user-specified identifier http://wh.com/s/123 to a particular application definition (310). One or more of remote computing systems 142 perform a lookup on all or a part of the user-specified identifier http://wh.com/s/123 to identify an application definition. Upon identifying the application definition, the one or more of remote computing systems 142 send the application definition app_def {package: com. wh.app, . . . } to computing device 100 (312).

Supervisor 302, upon receiving application definition app_def {package: com.wh.app, . . . } may associate the software developer-assigned package identifier for the application (com.wh.app) with the sub-identifier wh.com is a globally unique identifier for the navigation application in remote computing systems 142 (316). Supervisor 302 sends a message to application container 102A to execute the particular functionality specified in the initial request 300 (318). In some examples, the message may specify the application definition, the user-specified identifier, and/or one or more commands. As an example, the message sent in FIG. 3, START {app_def, http://wh.com/s/123}, includes the command START, the application definition app_def, and the user-specified identifier http://wh.com/s/123.

Application container 102A receives the message and initiates the particular functionality specified by the message. As application container 102A includes program code that loads and executes one or more installable sub-packages of the application, application container 102A, using the program code, performs a lookup to determine whether one or more sub-packages for performing the functionality specified by the suffix/s/123 are locally stored at computing device 100. In the example of FIG. 3, the/s portion of the suffix specifies settings functionality for which a sub-package implements the appearance and behavior of the settings functionality. The/123 suffix specifies an attribute that may be processed for defining the appearance and/or behavior of the user interface. For instance, the/123 suffix may specify a particular user interface provided in the settings functionality.

In response to determining that a sub-package for the settings functionality is not stored locally at computing device 100, application container 102A sends a message to one or more of remote computing systems 142 to retrieve the sub-package for the settings functionality (322). The message may comprise information including, but not limited to, the software developer-assigned package identifier for the application (com.wh.app) and the sub-package identifier (settings_function) for the sub-package that provides the settings functionality. The one or more remote computing systems that receive the message perform a lookup based on the software developer-assigned package identifier for the application (com.wh.app), and further based on the sub-package identifier (settings_function) for the sub-package, selects the sub-package for the settings functionality and sends the sub-package to application container (324). Application container 102A receives the settings_function sub-package (324). Computing device 100 may execute one or more executable components of the settings_function sub-package to perform the particular functionality specified in the request.

Figure 4:
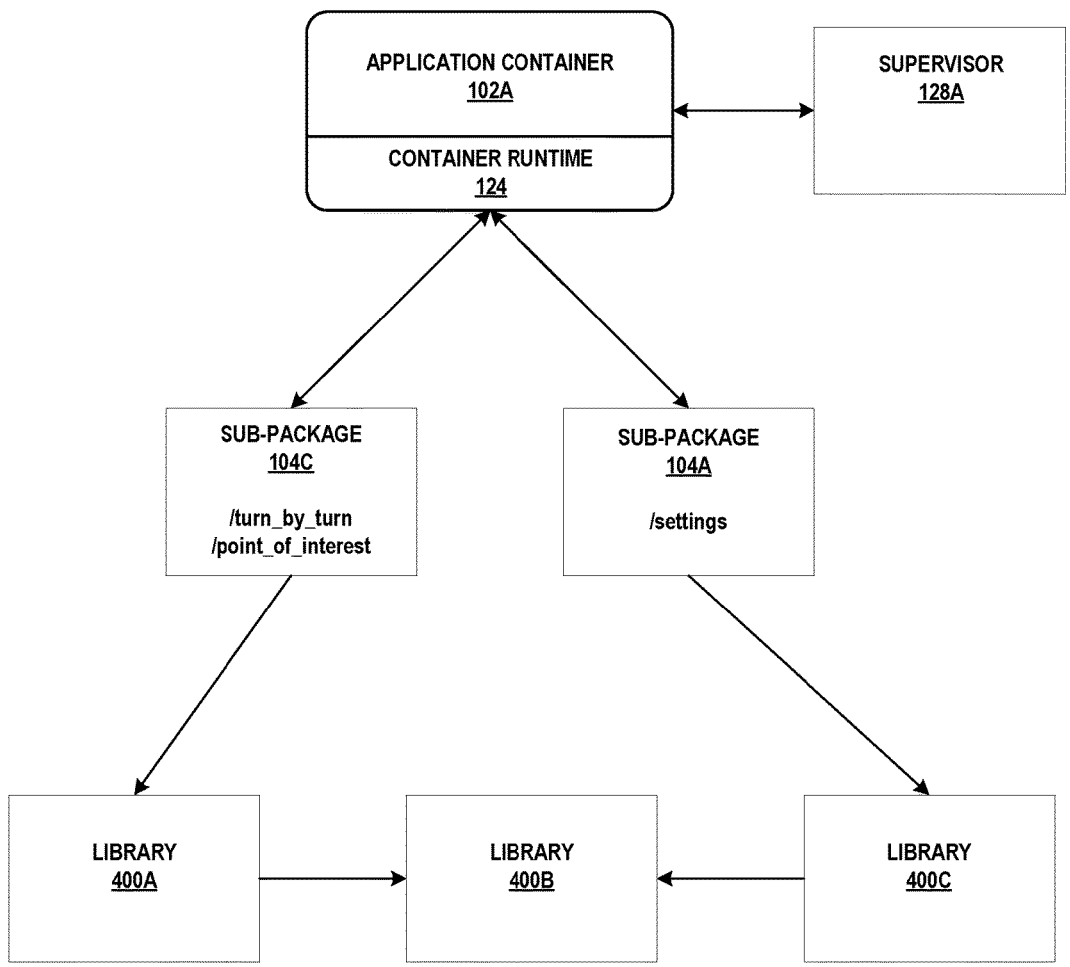
FIG. 4 is a conceptual diagram of an application containers for dynamically loading installable sub-packages and corresponding libraries, in accordance with techniques of this disclosure.

FIG. 4 is a conceptual diagram of an application containers for dynamically loading installable sub-packages and corresponding libraries, in accordance with techniques of this disclosure. FIG. 4 illustrates application container 102A of FIG. 1 with container runtime 124. Application container 102A communicates with supervisor component 128A. FIG. 4 illustrates relationship between application container 102A, sub-packages 104C and 104A, and libraries 400A-400C ("libraries 400"). Sub-package 104C includes functionality to implement turn-by-turn and points-of-interest user interfaces, as described in FIG. 1. Sub-package 104A includes functionality to implement the settings user interface, as described in FIG. 1.

If a user provides a user input to cause computing device 100 to display the settings user interface, application container 102A may determine whether sub-package 104A is stored locally on computing device 100. For instance, application container 102A may receive a URI with the /settings suffix and determine whether the corresponding sub-package is locally installed. If not, application container 102A may communicate with supervisor 128A to retrieve sub-package 104A from a remote computing system. In some examples, application container 102A may determine that sub-package 104A uses one or more libraries, such as library 400C to perform one or more operations. Application container 102A, and in some examples, loader 106 of application container 102A, may cause library 400C to be loaded into memory. For instance, application container 102A may send a message to supervisor 128A specifying library 400C, which causes library 400C to be loaded into memory. In another example, application container 104A may directly invoke library 400C, or may invoke library 400C through container runtime 124. In still other examples, upon loading sub-package 104A into memory, one or more executable components of sub-package 104A may invoke library 400C.

If library 400C and/or sub-package 104A has a transitive dependency on library 400B, then application container 102A, sub-package 104A, and/or supervisor 128A may also load library 400B. In this way, all libraries necessary for executing sub-package 104A are loaded into memory or are otherwise made accessible to application container 102A and/or sub-package 104A. In some examples, container runtime 124A includes libraries 400, while in other examples, libraries 400 are included in runtime system 126, as shown in FIG. 1.

In examples where libraries 400 are included in container runtime 124A, application container 102A may automatically update container runtime 124 by retrieving updated libraries locally and/or from a remote computing system. For instance, application container 102A may retrieve an application definition which specifies a minimum version of a library. Application container 102A may, based on the specified version, automatically retrieve a library that has at least the minimum version. In some examples, application container 102A may check periodically or asynchronously (e.g., when the application is initially loaded into memory) whether updated libraries are available and automatically retrieve such libraries from one or more remote computing systems. In this way, software developers may not have to check whether a library is up to date because the application container may guarantee that the libraries dependencies are satisfied by container runtime 124 before any executable components run. Moreover, container runtime 124 may be updated without the need to update operating system 136 and/or without the need update runtime system 126.

Figure 5:
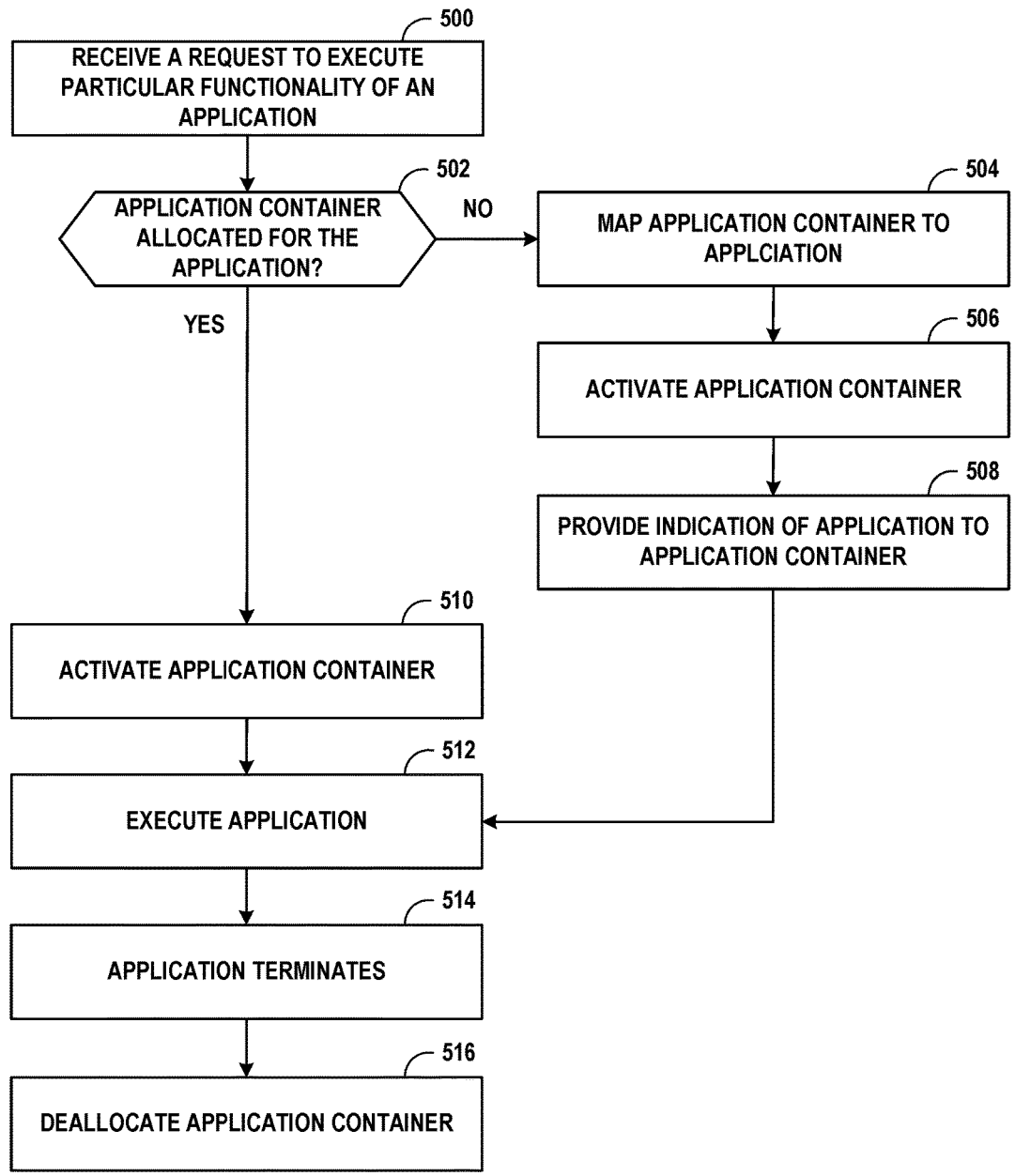
FIG. 5 is a flow diagram illustrating example operations of a computing device with application containers, in accordance with techniques of this disclosure.

FIG. 5 is a flow diagram illustrating example operations of a computing device with application containers for dynamically loading installable sub-packages, in accordance with techniques of this disclosure. For purposes of illustration only, the example operations are described below within the context of computing device 100 of FIG. 1.

In FIG. 5, computing device 100 may initially receive a request to execute particular functionality of an application (500). For instance, a user may provide a user input at computing device 100 to launch the application and supervisor component 128A of computing device 100 may receive an indication of the user input as a request to execute the application. Supervisor component 128A may determine whether an application container for maintaining installable sub-packages of the application (e.g., one of application containers 102, such as application container 102A) is allocated for the application (502). In determining whether an application container is allocated for the application, supervisor component 128A may perform a lookup in a data structure that includes a mapping of each allocated application container and corresponding application (e.g., mapping table 135). If the application is not found in mapping table 135, supervisor component 128A determines that no application container is currently allocated for the application ("NO" branch of 502). However, if the application is found in mapping table 135, supervisor component 128A determines that there is an application container (e.g., application container 102A) currently allocated for the application ("YES" branch of 502).

Responsive to determining that an application container for maintaining installable sub-packages of the application is not allocated for the application ("NO" branch of 502), computing device 100 may allocate an application container (e.g., application container 102A). In some instances, supervisor component 128A determines if there are any available application containers currently allocated in a memory (e.g., one of storage components 248 of FIG. 2) of computing device 100. That is, supervisor component 128A may determine if there are any application containers in application container pool 132 that are not allocated to a different application and are currently stored in the memory of computing device 100. If there are no available application containers currently allocated in the memory, supervisor component 128A allocates at least one application container in the memory of computing device 100.

In order to allocate an application container for the application, supervisor component 128A may map an application container (e.g., application container 102A) to the application (504). That is, supervisor component 128A may activate an existing entry in mapping table 135 or add a new entry to mapping table 135 that includes the mapping between the application and application container 102A. Supervisor component 128A may also activate application container 102A by, for example, initiating execution of application container 102A, causing operating system 136 to execute a process for application container 102A (506). Once application container 102A has been activated, supervisor component 128A provides an indication of the application to application container 102A (508) so that application container 102A may manage and execute the various sub-packages of the application.

If supervisor component 128A determines that there is an application container already allocated for the application ("YES" branch of 502), supervisor component 128A activates the application container (510). In these instances, supervisor component 128A may activate the application container in the same manner as described with respect to element 506. However, supervisor component 128A may refrain from providing the indication of the application to the activated application container as, because the application container was previously allocated to the application, the application container is already configured with the information for the application.

One allocated and activated, application container 102A executes the application (512). In various examples, application container 102A may retrieve various sub-packages of the application from remote computing systems, retrieve various dependencies, such as data dependencies, from the same or different remote computing systems, and general manage the execute of the application. At some point, the application terminates (514). The application may terminate in response to a user input to terminate execution, in response to a system termination event, or any other mechanism.

In response to the application terminating (514), supervisor component 128A may deactivate application container 102A mapped to the application (516). Supervisor component 128A deactivate application container 102A in a variety of different ways. For example, supervisor component 128A may remove the mapping of the application container to the application for mapping table 135. As another example, supervisor component 128A may reset a state of the application container for the application. As another example, supervisor component 128A may deallocate the application container for the application from a memory of computing device 100. While described as distinct examples, supervisor component 128A may deactivate application container 102A by performing one or more of removing the mapping, resetting the state, and deallocating application container 102A from the memory.

Example 1

A method comprising: receiving, by a supervisor component executing at a computing device, a request to execute an application; determining, by the supervisor component, whether any application container is currently allocated for the application; responsive to determining that an application container is currently allocated for the application: activating, by the supervisory, the application container currently allocated for the application; and executing, by the application container for the application, the application; and responsive to terminating execution of the application, deactivating, by the supervisor component, the application container for the application.

Example 2

The method of example 1, further comprising: responsive to determining that no application container is currently allocated for the application: mapping, by the supervisor component, the application container to the application; activating, by the supervisor component, the application container for the application; and providing, by the supervisor component and to the application container, an indication of the application.

Example 3

The method of example 2, further comprising: responsive to terminating execution of the application, removing, by the supervisor component, the mapping of the application container to the application.

Example 4

The method of any combination of examples 1-3, wherein determining whether any application container is currently allocated for the application comprises: performing, by the supervisor component, a lookup in a data structure including a mapping of each allocated application container and corresponding application; responsive to determining that the application is not found in the data structure, determining, by the supervisor component, that no application container is currently allocated for the application; and responsive to determining that the application is found in the data structure, determining, by the supervisor component, that the application container is currently allocated for the application.

Example 5

The method of any combination of examples 1-4, further comprising: prior to receiving the request to execute the application: determining, by the supervisor component, whether there are any available application containers currently allocated in a memory of the computing device; and responsive to determining that there are no available application containers currently allocated in the memory, allocating at least one application container in the memory of the computing device, wherein the application container for the application is allocated in the memory of the computing device.

Example 6

The method of any combination of examples 1-5, wherein deactivating the application container for the application comprises resetting a state of the application container for the application.

Example 7

The method of any combination of examples 1-5, wherein deactivating the application container for the application comprises deallocating the application container for the application from a memory of the computing device.

Example 8

The method of any combination of examples 1-5, wherein deactivating the application container for the application comprises removing a mapping of the application container to the application from a data structure stored in a memory of the computing device.

Example 9

The method of any combination of examples 1-8, wherein the application container includes program code that loads and executes one or more installable sub-packages of the application.

Example 10

A computing device comprising: one or more storage components that store a supervisor component; and one or more processors that execute the supervisor component to: receive a request to execute an application; determine whether any application container is currently allocated for the application; and responsive to determining that an application container is currently allocated for the application, activate the application container currently allocated for the application, wherein the one or more processors execute the application container to execute the application, and wherein the one or more processors execute the supervisor component to, in response to the application ceasing execution, deactivate the application container for the application.

Example 11

The computing device of example 10, wherein the one or more storage components further store a data structure, and wherein the one or more processors execute the supervisor component to, responsive to determining that no application container is currently allocated for the application: map the application container to the application by at least storing an indication of an association between the application container and application in the data structure; activate the application container for the application; and provide, to the application container, an indication of the application.

Example 12

The computing device of example 11, wherein the one or more processors execute the supervisor component to, responsive to terminating execution of the application, remove the mapping of the application container to the application.

Example 13

The computing device of any combination of examples 10-12, wherein the one or more storage components further store a data structure that includes a mapping of each allocated application container and corresponding application, and wherein the one or more processors execute the supervisor component to determine whether any application container is currently allocated for the application comprises by at least executing the supervisor component to: perform a lookup in the data structure; responsive to determining that the application is not found in the data structure, determine that no application container is currently allocated for the application; and responsive to determining that the application is found in the data structure, determine that the application container is currently allocated for the application.

Example 14

The computing device of any combination of examples 10-13, wherein the one or more processors execute the supervisor component to, prior to receiving the request to execute the application: determine whether there are any available application containers currently allocated in the one or more storage components of the computing device; and responsive to determining that there are no available application containers currently allocated in the one or more storage components, allocate at least one application container in the memory of the computing device, wherein the application container for the application is allocated in the one or more storage components of the computing device.

Example 15

The computing device of any combination of examples 10-14, wherein the one or more processors execute the supervisor component to deactivate the application container for the application by at least executing the supervisor component to reset a state of the application container for the application.

Example 16

The computing device of any combination of examples 10-14, wherein the one or more processors execute the supervisor component to deactivate the application container for the application by at least executing the supervisor component to deallocate the application container for the application from the one or more storage components of the computing device.

Example 17

The computing device of any combination of examples 10-16, wherein the one or more storage components further store a data structure that includes a mapping of each allocated application container and corresponding application, and wherein the one or more processors execute the supervisor component to deactivate the application container for the application by at least executing the supervisor component to remove a mapping of the application container to the application from a data structure stored in the one or more storage components of the computing device.

Example 18

A non-transitory computer-readable storage medium encoded with instructions that, when executed by one or more processors of a computing device, cause the one or more processors to: receive a request to execute an application; determine whether any application container is currently allocated for the application; responsive to determining that an application container is currently allocated for the application: activate the application container currently allocated for the application; and execute, using the application container, the application; and responsive to terminating execution of the application, deactivate the application container for the application.

Example 19

The non-transitory computer-readable storage medium of example 18, wherein the instructions further cause the one or more processors to: responsive to determining that no application container is currently allocated for the application: map the application container to the application; activate the application container for the application; and provide, to the application container, an indication of the application.

Example 20

The non-transitory computer-readable storage medium of any combination of examples 18 and 19, wherein the instructions further cause the one or more processors to: perform a lookup in a data structure including a mapping of each allocated application container and corresponding application; responsive to determining that the application is not found in the data structure, determine that no application container is currently allocated for the application; and responsive to determining that the application is found in the data structure, determine that the application container is currently allocated for the application.

Example 21

An apparatus comprising means for performing any combination of the methods of examples 1-9.

Example 22

A computer-readable storage medium encoded with instructions that, when executed, cause one or more processors of a computing device to perform any combination of the methods of examples 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:
1. A method comprising:
receiving, by a supervisor component executing at a computing device, a request to execute an application;
determining, by the supervisor component, whether an application container is currently allocated for the application at the computing device, wherein the application container maintains installable sub-packages of the application, and wherein each installable sub-package of the application includes a respective set of executable components providing a discrete set of functionality for the application;
responsive to determining that the application container is currently allocated for the application at the computing device:
activating, by the supervisor component, the application container currently allocated for the application at the computing device;
executing, by the application container for the application, the application; and
responsive to predicting that additional functionality of the application will be needed, retrieving, by the application container and from a remote computing device, a particular installable sub-package of the application that includes the additional functionality; and responsive to terminating execution of the application, deactivating, by the supervisor component, the application container for the application at the computing device.

2. The method of claim 1, further comprising:
responsive to determining that the application container is not currently allocated for the application:
  mapping, by the supervisor component, the application container to the application;
  activating, by the supervisor component, the application container for the application; and
  providing, by the supervisor component and to the application container, an indication of the application.

3. The method of claim 2, further comprising:
responsive to terminating execution of the application, removing, by the supervisor component, the mapping of the application container to the application.

4. The method of claim 1, wherein determining whether the application container is currently allocated for the application comprises:
  performing, by the supervisor component, a lookup in a data structure including a mapping of each allocated application container and corresponding application;
  responsive to determining that the application is not found in the data structure, determining, by the supervisor component, that the application container is not currently allocated for the application; and
  responsive to determining that the application is found in the data structure, determining, by the supervisor component, that the application container is currently allocated for the application.

5. The method of claim 1, further comprising:
prior to receiving the request to execute the application:
  determining, by the supervisor component, whether there are any available application containers currently allocated in a memory of the computing device; and
  responsive to determining that there are no available application containers currently allocated in the memory, allocating at least one application container in the memory of the computing device,
wherein the application container for the application is allocated in the memory of the computing device.

6. The method of claim 1, wherein deactivating the application container for the application comprises resetting a state of the application container for the application.

7. The method of claim 1, wherein deactivating the application container for the application comprises deallocating the application container for the application from a memory of the computing device.

8. The method of claim 1, wherein deactivating the application container for the application comprises removing a mapping of the application container to the application from a data structure stored in a memory of the computing device.

9. A computing device comprising:
one or more storage components that store a supervisor component; and
one or more hardware processors that execute the supervisor component to:
  receive a request to execute an application;
  determine whether an application container is currently allocated for the application, wherein the application container maintains installable sub-packages of the application, and wherein each installable sub-package of the application includes a respective set of executable components providing a discrete set of functionality for the application; and
  responsive to determining that the application container is currently allocated for the application, activate the application container currently allocated for the application, wherein the one or more processors execute the application container to:
    execute the application; and
    responsive to predicting that additional functionality of the application will be needed, retrieve, from a remote computing device, a particular installable sub-package of the application that includes the additional functionality, and
  wherein the one or more processors execute the supervisor component to, in response to the application ceasing execution, deactivate the application container for the application.

10. The computing device of claim 9,
wherein the one or more storage components further store a data structure, and
wherein the one or more hardware processors execute the supervisor component to, responsive to determining that the application container is not currently allocated for the application:
  map the application container to the application by at least storing an indication of an association between the application container and application in the data structure;
  activate the application container for the application; and
  provide, to the application container, an indication of the application.

11. The computing device of claim 10, wherein the one or more hardware processors execute the supervisor component to, responsive to terminating execution of the application, remove the mapping of the application container to the application.

12. The computing device of claim 9,
wherein the one or more storage components further store a data structure that includes a mapping of each allocated application container and corresponding application, and
wherein the one or more hardware processors execute the supervisor component to determine whether the application container is currently allocated for the application comprises by at least executing the supervisor component to:
  perform a lookup in the data structure;
  responsive to determining that the application is not found in the data structure, determine that the application container is not currently allocated for the application; and
  responsive to determining that the application is found in the data structure, determine that the application container is currently allocated for the application.

13. The computing device of claim 9, wherein the one or more hardware processors execute the supervisor component to, prior to receiving the request to execute the application:
  determine whether there are any available application containers currently allocated in the one or more storage components of the computing device; and
  responsive to determining that there are no available application containers currently allocated in the one or more storage components, allocate at least one application container in the memory of the computing device,
wherein the application container for the application is allocated in the one or more storage components of the computing device.

14. The computing device of claim 9, wherein the one or more hardware processors execute the supervisor component to deactivate the application container for the application by at least executing the supervisor component to reset a state of the application container for the application.

15. The computing device of claim 9, wherein the one or more hardware processors execute the supervisor component to deactivate the application container for the application by at least executing the supervisor component to deallocate the application container for the application from the one or more storage components of the computing device.

16. The computing device of claim 9,
wherein the one or more storage components further store a data structure that includes a mapping of each allocated application container and corresponding application, and
wherein the one or more processors execute the supervisor component to deactivate the application container for the application by at least executing the supervisor component to remove a mapping of the application container to the application from a data structure stored in the one or more storage components of the computing device.

17. A non-transitory computer-readable storage medium encoded with instructions that, when executed by one or more processors of a computing device, cause the one or more processors to:
receive a request to execute an application;
determine whether an application container is currently allocated for the application, wherein the application container maintains installable sub-packages of the application, and wherein each installable sub-package of the application includes a respective set of executable components providing a discrete set of functionality for the application;
responsive to determining that the application container is currently allocated for the application:
activate the application container currently allocated for the application;
execute, using the application container, the application; and
responsive to predicting that additional functionality of the application will be needed, retrieve, from a remote computing device, a particular installable sub-package of the application that includes the additional functionality; and
responsive to terminating execution of the application, deactivate the application container for the application.

18. The non-transitory computer-readable storage medium of claim 17, wherein the instructions further cause the one or more processors to:
responsive to determining that the application container is not currently allocated for the application:
map the application container to the application;
activate the application container for the application; and
provide, to the application container, an indication of the application.

19. The non-transitory computer-readable storage medium of claim 17, wherein the instructions further cause the one or more processors to:
perform a lookup in a data structure including a mapping of each allocated application container and corresponding application;
responsive to determining that the application is not found in the data structure, determine that the application container is not currently allocated for the application; and
responsive to determining that the application is found in the data structure, determine that the application container is currently allocated for the application.

* * * * *